UNITED STATES PATENT OFFICE.

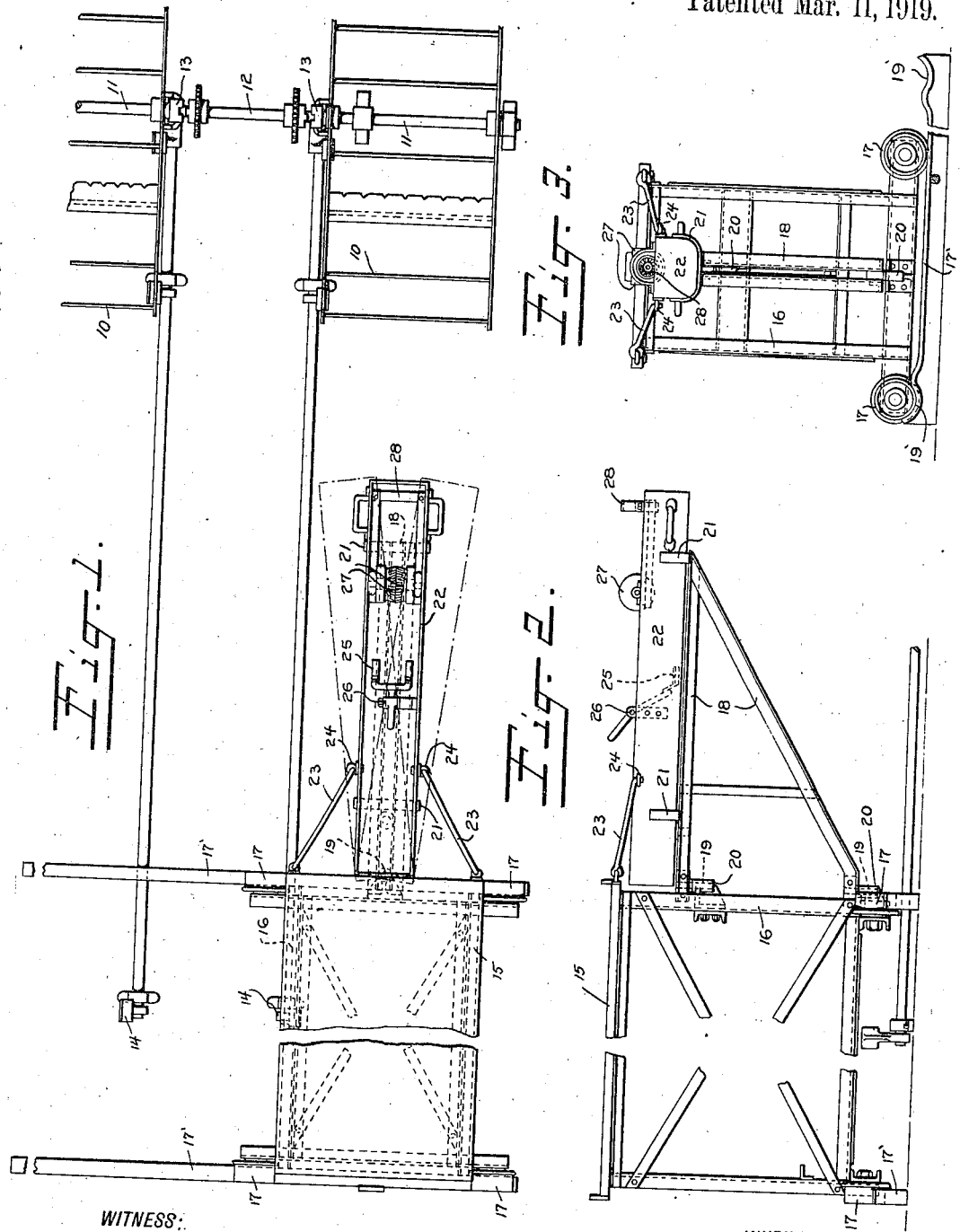

GEORGE McNEILL, OF DETROIT, MICHIGAN, ASSIGNOR TO MORGAN & WRIGHT, A CORPORATION OF MICHIGAN.

BEAD CEMENTING AND REELING MACHINE.

1,296,990.     Specification of Letters Patent.     Patented Mar. 11, 1919.

Application filed August 10, 1916. Serial No. 114,150.

*To all whom it may concern:*

Be it known that I, GEORGE MCNEILL, a citizen of the United States, and a resident of Detroit, county of Wayne, and State of Michigan, have invented certain new and useful Improvements in Bead Cementing and Reeling Machines, of which the following is a full, clear, and exact description.

This invention relates to apparatus for preparing beads for use in building tires. In the manufacture of tires it is customary to employ beads which are formed of hard rubber composition and serve to stiffen the tire at the edges. Usually the bead is tubed in the form of a ribbon of triangular cross-section, and must be coated with cement to prepare it for building into the tire. The apparatus of the present invention is designed to permit the tubed bead to be inspected for flaws, uniformly cemented on all sides, and reeled up for future use; these steps being performed as a continuous operation.

The invention can be easily understood from the following description taken in connection with the accompanying drawing, in which:

Figure 1 is a plan view of apparatus constructed in accordance with the invention;

Fig. 2 is a side elevation of the cementing trough and inspecting table shown in Fig. 1;

Fig. 3 is an end elevation of the parts shown in Fig. 2.

Referring now to the drawing, in which like characters of reference designate similar parts, 10 designates a reel upon which the bead is wound helically in a single layer, the reel being mounted on a shaft 11 which is preferably power-turned by a drive shaft 12, there being a clutch 13 connecting the shafts and controlled by a pedal 14. The above parts are duplicated a plurality of times as shown, for the purpose of obtaining the maximum capacity of the parts hereinafter described.

An inspecting table 15 is mounted upon a frame 16 which is provided with supporting wheels 17 that run upon track rails 17', there being depressions 19' in the rails at suitable intervals to receive the wheels and anchor the inspecting table directly in front of any one of the reels 10 which the operator wishes to load. A frame 18 is mounted on vertical pivots 19 which are received in bearings 20 carried by the frame 16. At intervals brackets 21 are positioned on the frame 18 and secure a cement-containing trough 22 to the frame, the trough being swingable in an arc from the inspecting table 15 on the pivots 19, as shown in dotted outline in Fig. 1. A pair of hooks 23 are secured to the inspecting table and are received in eyes 24 carried by the trough and serve to hold the trough against swinging movement while the device is being moved along the track rails, or when the device is not in use. A forked guide 25 is pivoted on the trough, as shown at 26, and serves to hold the bead down in the cement so that all sides of the bead will be coated. A pair of brushes 27 are secured to the walls of the trough and confront each other, as shown in Fig. 1, these brushes serving to spread the cement uniformly over the sides of the bead. A brush 28 of circular form is secured to the discharge end of the trough, and in addition to spreading the cement uniformly, also serves as a guide from which the bead passes onto the reel.

In operation, the bead to be treated is trained endwise over the inspecting table 15, through the trough 22, underneath the guide 25 and between and through the brushes 27 and 28 respectively, and is terminally connected to the reel 10. The pedal 14 is now operated by the inspector to start the reel, whereupon the latter will draw the bead continuously onto itself in a helical layer through the path above outlined. The hooks 23 having been released prior to the starting of the reel, the trough may swing freely on its pivots and permit the cemented bead to pass from the trough to the reel with minimum bending. Thus binding of the bead against the brush 28, brush 27, or guide 25, and danger of the bead being broken or unevenly cemented in transit to the reel, will be prevented. When a flaw is encountered in the bead, the apparatus may be stopped immediately by operating the pedal 14, which for convenience is placed directly below the inspecting table and between the track rails, as shown. When one reel has been loaded, the table is pushed along the track rails and stationed in front of the next empty reel and the above operation repeated.

Having described my invention, what I claim and desire to protect by Letters Patent is:

1. A bead cementing and reeling machine comprising a reel for the bead, a trough for cementing the bead, and a pivot on which the trough is free to swing to permit the bead to pass to the reel with minimum bending.

2. A bead cementing and reeling machine comprising a reel for the bead, a trough for cementing the bead, a table for supporting and permitting inspection of the bead at one end of the trough, and a pivot on which the trough is free to swing in an arc from the table to deliver the cemented bead to the reel with minimum bending.

3. A bead cementing and reeling machine comprising a plurality of reels for the bead, a wheeled support, track rails for the support, depressions in the rails for receiving the wheels of the support and anchoring the support in front of any desired reel and a pivotally mounted trough for cementing the bead secured at one end to the support and having its free end confronting one of the reels.

4. A bead cementing and reeling machine comprising a reel for the bead, a pivotally mounted trough for cementing the bead, an inspecting table for the bead at one end of the trough, power-driven means for rotating the reel to draw the beads thereonto through the trough and across the table, and means near the table for controlling said power-driven means.

Signed at Detroit, Michigan, this 28th day of July 1916.

GEORGE McNEILL.